E. O. LUNDIN.
ASSEMBLING MACHINE.
APPLICATION FILED APR. 3, 1920.
1,365,257.
Patented Jan. 11, 1921.
2 SHEETS—SHEET 1.
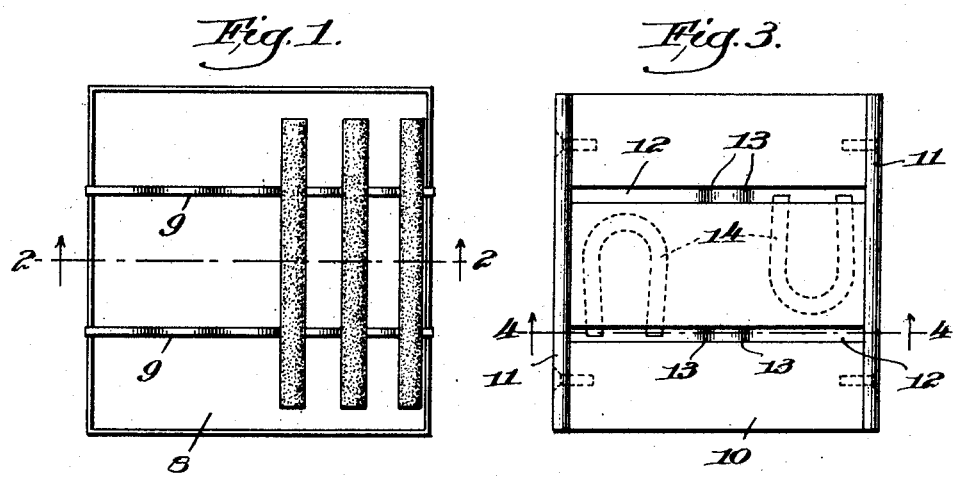
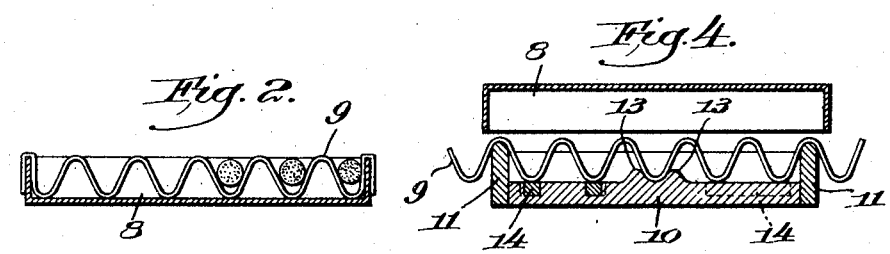
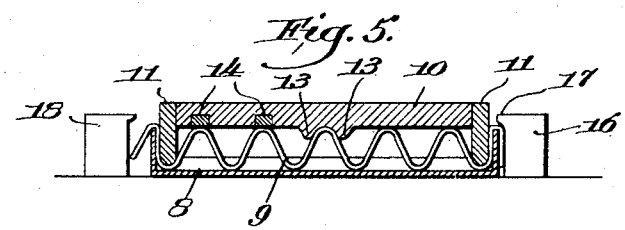
Inventor,
Emil O. Lundin,
by Roberts Roberts & Cushman
his Attys.

E. O. LUNDIN.
ASSEMBLING MACHINE.
APPLICATION FILED APR. 3, 1920.

1,365,257.

Patented Jan. 11, 1921.
2 SHEETS—SHEET 2.

Inventor,
Emil O. Lundin,
by Roberts Roberts & Cushman
his Atty's.

UNITED STATES PATENT OFFICE.

EMIL O. LUNDIN, OF NEWTON CENTER, MASSACHUSETTS, ASSIGNOR TO STANDARD CRAYON MANUFACTURING COMPANY, OF DANVERS, MASSACHUSETTS, A CORPORATION OF MASSACHUSETTS.

ASSEMBLING-MACHINE.

1,365,257. Specification of Letters Patent. Patented Jan. 11, 1921.

Application filed April 3, 1920. Serial No. 370,989.

*To all whom it may concern:*

Be it known that I, EMIL O. LUNDIN, a resident of Newton Center, in the county of Middlesex and State of Massachusetts, have invented new and useful Improvements in Assembling-Machines, of which the following is a specification.

My invention relates to a machine for assembling separator members in containers adapted to hold crayons or the like. More specifically the invention relates to means adapted to place the separator members on the containers and to crimp the separators into firm engagement with the ends of the container.

It is highly desirable in packaging crayons or similar articles to provide a member for retaining the several elements in fixed relation on the package. I have devised an improved container fitted with separator members which I have disclosed and claimed in application Serial No. 370,990, filed on even date herewith, and I have also devised an improved machine for forming the separator elements which I have disclosed and claimed in application Serial No. 370,991, also filed on even date herewith. The present application relates to an apparatus for assembling separator members in the boxes to form my improved container for crayons or the like.

While it is possible to attach the separator members to the boxes by hand with the use of pliers, such a method is slow and costly and will not turn out uniform work. It is highly essential that the work be uniform if the separators are to be of utility and from a commercial standpoint it is also essential that the containers be constructed at small cost.

It is an object of my invention to provide an apparatus adapted quickly and firmly to attach separator members to boxes or similar containers. It is a further object to provide apparatus of the character described which is simple in construction and efficient in operation, which may if desired be operated without mechanical power and which will be positive and uniform in its operation and result.

I have illustrated a preferred form of my invention in the accompanying drawing, in which—

Figure 1 is a plan view of my improved crayon container;

Fig. 2 is a cross section on line 2—2 of Fig. 1;

Fig. 3 is a plan view of the die used with my apparatus;

Fig. 4 is a section on line 4—4 of Fig. 3, showing also a separator member and box;

Fig. 5 is a view showing the die, separator member, and box assembled, the relation to the rest of the apparatus being indicated diagrammatically;

Figure 6:
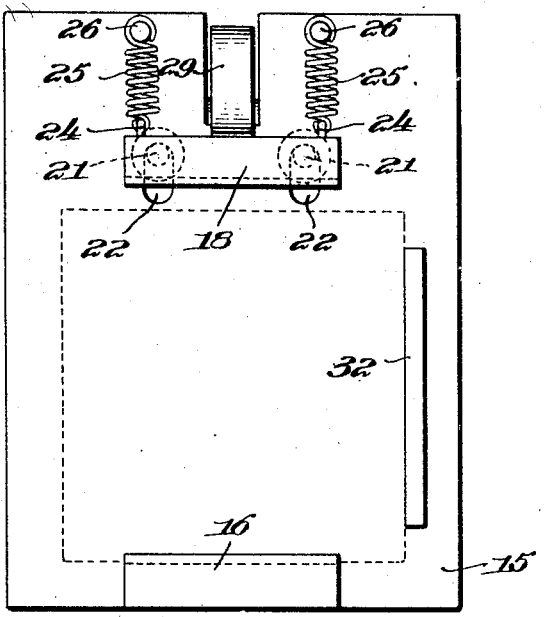
Fig. 6 is a plan view of the apparatus.

As shown in Figs. 1 and 2, my improved container comprises a box 8 of any usual construction having the corrugated separator members 9 therein. The ends of these members overlap the edges of the box and are firmly crimped into engagement therewith.

The die portion of my setting apparatus as shown in detail in Figs. 3, 4 and 5, comprises a body member 10 and side elements 11. The body member 10 is preferably formed of some light, diamagnetic material such as aluminum and the side members 11 are preferably formed of a strong bronze or brass although these materials are not essential. The member 10 has a plurality of cross channels or grooves 12 formed therein, the number and location depending upon the number of separator members to be used. Preferably several raised portions 13 are located in the base of these grooves to aid in positioning the separator elements. In order to retain the separator elements in the grooves, magnets 14 may be provided embedded in the member 10 with their poles located on the base of the grooves. The separator elements are usually formed of steel ribbon or other paramagnetic material and will therefore be held by the magnets.

Figure 7:
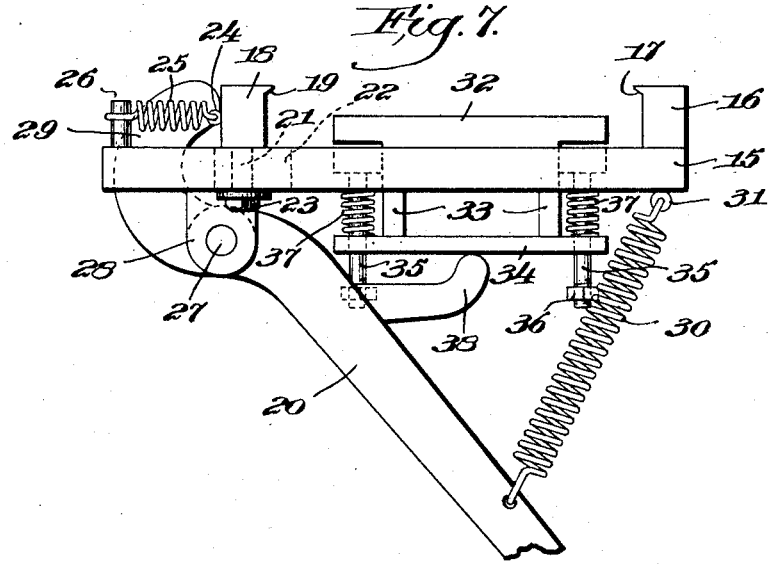
Fig. 7 is a view of Fig. 6 as seen from the left side.

The main portion of the machine is illustrated in Figs. 6 and 7 and comprises a table member 15, having at one end a fixed setting lug 16 which has an overhanging lip 17, a movable setting lug 18 with a lip 19, and an actuating lever 20 hung from the table portion 15.

The movable setting lug 18 has stud bolts 21 projecting from its lower side, the bolts being guided in slots 22 on the member 15, and having the nuts 23 threaded on their lower ends. Eyes 24 are provided on the rear face of the lug 18, and have attached thereto the springs 25 whose other ends are attached to studs 26. The springs are tensioned so as to normally retain the lug 18 at the rear extremity of the slots 22.

The lever 20 is hung on the pintle 27 which is suspended below the table portion 15 by the lugs 28. An upwardly and forwardly curved portion 29 of the lever 20 bears against the rear face of lug 18. A spring 30 is attached to the lever 20 and to an eye 31 attached to the forward portion of the lower side of the table member 15.

A vertically movable stop member 32 is located at one side of the table, the member having downwardly extending legs 33 passing through the table and attached to an actuator bar 34. The table is recessed so that the stop 32 may fit down into the recess with its top flush with the table top. The actuator bar 34 has openings at either end through which pass bolts 35 having the nuts 36 threaded on the ends thereof. Springs 37 surround these bolts and bear against the under side of the table and the upper side of the actuator bar 34, thus retaining the stop 32 normally in the recess in the table top. A pressure arm 38 is attached to the lever 20 and is so disposed that its upper end bears against the lower side of the bar 34. The spring 30 is stronger than the combination of the two springs 37 so that the normal position of the whole machine is as shown in Fig. 7.

In the operation of my apparatus the separator elements are placed in the die as shown in Fig. 4, the box is placed thereon and the assembly inverted as shown in Fig. 5 and placed upon the table between the lugs 16 and 18, the box covering the area indicated by dotted lines in Fig. 6. The stop 32 acts to locate the box so that the lugs 16 and 18 will contact properly with the ends of the separator member. The lever 20 is now given a downward movement, preferably by means of a pedal. The first part of this movement draws down the arm 38 so that the stop 32 may drop down. All of the movement of the lever also moves the lug 18 forward by means of the portion 29 of the lever. As indicated in Fig. 5, this movement of the lug 18 acts to press the die and box firmly against the lug 16. Lugs 16 and 18 therefore firmly crimp the adjacent ends of the separator 9 against the ends of the box and the side elements 11 press the separator 9 against the inner side of the box end so that the result is a firm crimped engagement.

Pressure on the pedal is now released and during the first part of the upward motion of the lever 20 and until the arm 38 comes into contact with the bar 34, the stop 32 remains down so that the die and completed container may be removed by pushing them to the right, as, for instance, by the pressure against them of the next box to be operated upon. As the movement of the lever 20 continues the stop 32 is pushed upward and serves to locate the next box upon which work is to be done.

The double end connection of the bar 18 permits it to automatically adjust itself to any irregularities in the shape of the dies or thickness of the box ends or separator members and insures an even firm crimp.

I claim:

1. In a machine of the class described, a table member, a fixed setting lug and a movable setting lug adapted to grip a die therebetween, a lever adapted to operate said movable lug, said lever having an arm extending therefrom, a spring-pressed lateral guide member adapted to be reciprocated vertically by said arm and when in the upper position to locate the die relative to the setting lugs.

2. In a machine of the class described, a table member, a fixed setting lug and a movable setting lug on said table member, said lugs being adapted to grip a die therebetween, springs holding said movable setting lug normally away from said fixed setting lug, a lever hung from said table member for moving said movable lug relative to said fixed lug, said lever having an arm extending therefrom, a vertically movable, spring-pressed, lateral guide member attached by means of legs extending through the table to an actuator bar thereunder, said lever arm being adapted to contact with said actuator bar to reciprocate the guide member.

3. In a machine of the class described, a table member, a fixed setting lug and a movable setting lug on said table member, said lugs being adapted to grip a die therebetween, springs holding said movable setting lug normally away from said fixed setting lug, a lever hung from said table member for moving said movable lug relative to said fixed lug, said lever having an arm extending therefrom, a vertically movable spring-pressed, lateral guide member attached by means of legs extending through the table to an actuator bar thereunder, said lever arm being adapted to contact with said actuator bar to reciprocate the guide member, said members being so related that the guide member rises substantially midway of the rearward stroke of the movable lug and lowers substantially midway of the forward stroke.

4. A die adapted for use in a machine of the class described, said die having channels therein adapted to receive corrugated separator members, and having raised portions in the bases of said channels adapted to center the separator members.

5. A die adapted for use in a machine of the class described, said die having channels therein adapted to receive separator members and having magnets adjacent said channels adapted to maintain said separator members therein.

6. A die adapted for use in a machine of the class described, said die having channels therein adapted to receive corrugated separator members, and having raised portions in the bases of said channels adapted to center the separator members and having magnets adjacent said channels adapted to maintain said separator members therein.

7. A die adapted for use in a machine of the class described, said die having channels therein adapted to receive separator members, said die comprising a diamagnetic body member and magnets therein adjacent said channels, said magnets being adapted to maintain the separator members in said channels.

Signed by me at Boston, Massachusetts, this first day of April 1920.

EMIL O. LUNDIN.